April 28, 1925.
A. C. BREJSKA
1,535,762
WHEEL REMOVING DEVICE
Filed Jan. 10, 1924
2 Sheets-Sheet 1
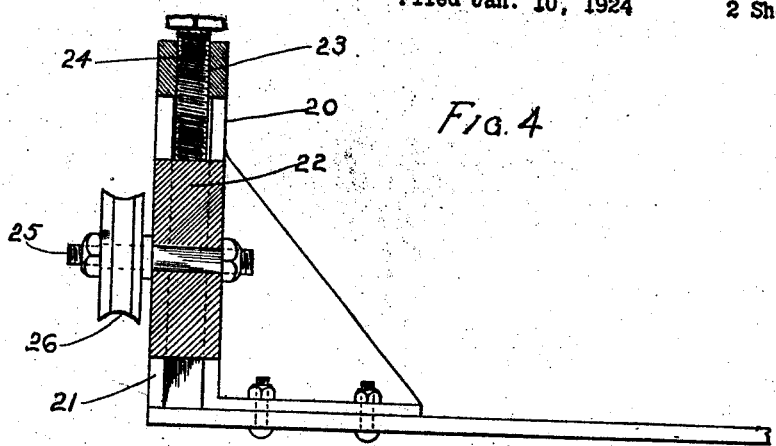
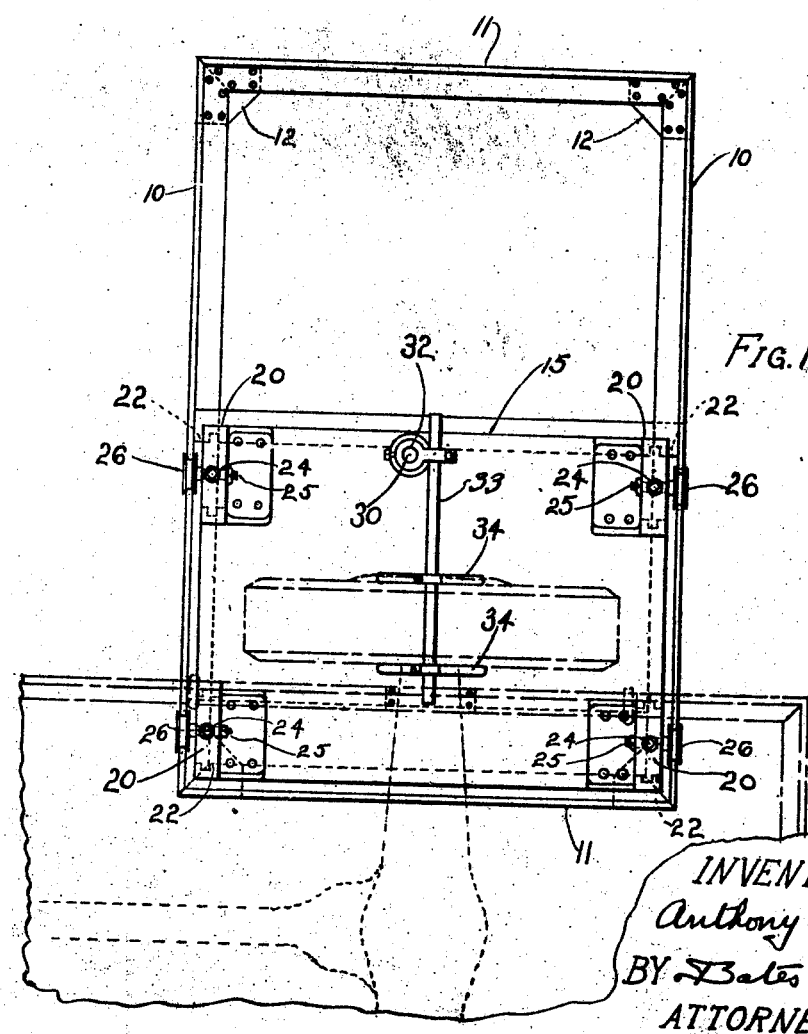
INVENTOR
Anthony C. Brejska
BY Bates Macklin
ATTORNEYS April 28, 1925.

A. C. BREJSKA

WHEEL REMOVING DEVICE

Filed Jan. 10, 1924

1,535,762

2 Sheets-Sheet 2

INVENTOR
Anthony C. Brejska,
BY Bates Macklin
ATTORNEYS

Patented Apr. 28, 1925.

1,535,762

UNITED STATES PATENT OFFICE.

ANTHONY C. BREJSKA, OF CLEVELAND, OHIO, ASSIGNOR OF ONE-HALF TO LOUIS HORLEY, OF CLEVELAND, OHIO.

WHEEL-REMOVING DEVICE.

Application filed January 10, 1924. Serial No. 685,429.

*To all whom it may concern:*

Be it known that I, ANTHONY C. BREJSKA, a citizen of the United States, residing at Cleveland, in the county of Cuyahoga and State of Ohio, have invented a certain new and useful Improvement in a Wheel-Removing Device, of which the following is a full, clear, and exact description, reference being had to the accompanying drawings.

This invention relates to means for enabling the raising and transporting of heavy objects to be accomplished, and is particularly concerned with the provision of a device for facilitating the removal and replacement of a wheel from the axle of a motor vehicle.

Considerable difficulty has heretofore been experienced particularly in removing the wheels of motor trucks, since such wheels usually weigh several hundred pounds. The friction due to the weight of the wheel upon an axle is often sufficiently great to require three men for handling the wheel. Moreover the weight of such wheels not only make the removal thereof a dangerous undertaking, but also tends to damage the threaded end of the axle.

One of the objects of my invention therefore is the provision of a device by which wheels of motor vehicle trucks may be safely removed and replaced by one man without endangering himself and without damaging the axle.

A further object of my invention is the provision of a simple device which may be readily constructed, easily brought into operative position with relation to the motor vehicle, and readily operable to effect replacement of a wheel.

I carry out the above objects by employing a frame which constitutes a track-way upon which a carriage is adapted to travel. The carriage is arranged to be movable vertically with relation to the frame by suitable connections with the wheels on which the carriage is supported. The frame together with the carriage is adapted to be placed beneath a vehicle wheel after such wheel has been elevated by a jack, whereupon the carriage is raised sufficiently to engage the wheel and thereby to remove the weight thereof from the axle. The carriage may then be moved along the track-way and the truck wheel removed. The reverse procedure is followed to replace the wheel on the axle.

The specific means for carrying out my invention is illustrated in the preferred form of the drawings. The essential characteristics of my invention, however, will be summarized in the claims.

Figure 2:
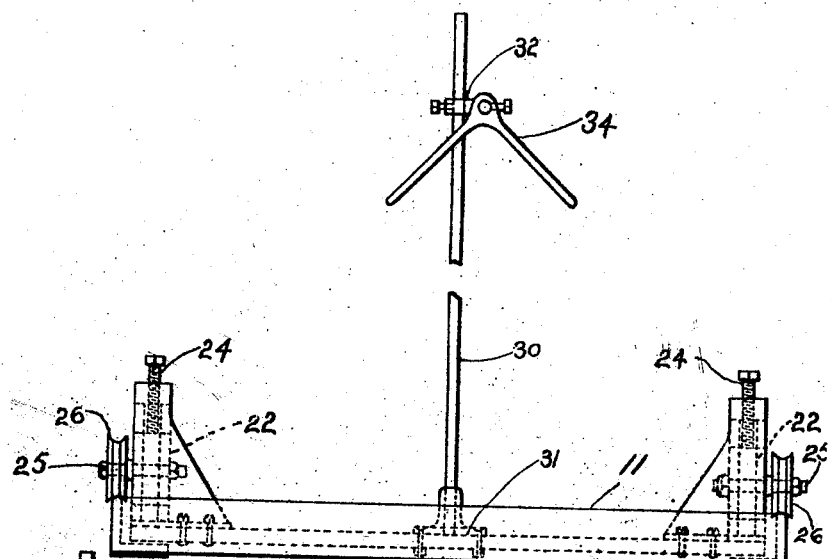
Figure 3:
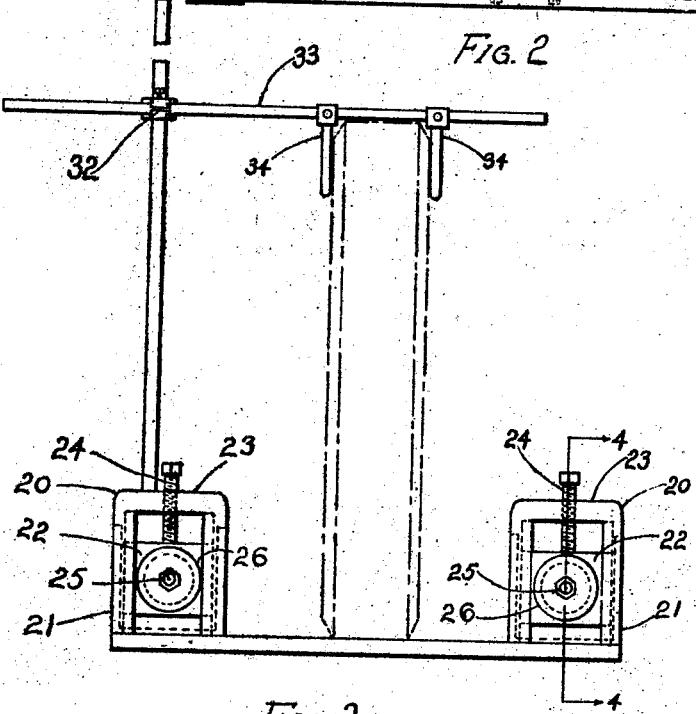

In the drawings, Fig. 1 is a plan view of a device embodying my invention and showing diagrammatically a truck wheel positioned thereon; Fig. 2 is an end elevation of the device; Fig. 3 is a side elevation of the carriage apart from the frame; and Fig. 4 is a section taken on an enlarged scale on the line 4—4 in Fig. 3.

The preferred form of carrying out my invention is illustrated as embodying a frame having side members 10 and end members 11 which are connected at the corners by suitable fastening members 12. Each of these members is shown as an angle iron, one flange of which is adapted to rest upon the ground or floor, and the other flange of which extends upwardly. The vertical flanges are adapted to provide a track-way for a carriage indicated in general at 15.

The carriage illustrated embodies a platform which is arranged to extend between the vertical flanges of the frame. Adjacent each corner of the platform I have shown a yoke 20 having side members 21 which form a guide-way for a block 22, and having a transverse connecting piece 23 which is threaded to receive a spindle 24. These yokes are so disposed with relation to the platform that a shaft 25 carried by each block also supports a wheel 26 which is adapted to travel on the track-way.

The connection between the platform and wheels is arranged to permit vertical movement of the platform with reference to the frame. Accordingly the length of the guide-way in each yoke 20 is such that the top of the platform may extend beneath the top of track-way when the carriage is in the lowermost position, and may be brought above the top of the track-way when the carriage is adapted to engage a truck wheel. Thus, the axle supporting a wheel to be removed, need only be raised sufficiently to permit the bottom of the wheel to clear the trackway.

To hold a wheel on the carriage after the carriage has been raised sufficiently to remove the weight of the wheel from the supporting axle, I have shown an adjusting means mounted on the carriage. This means is adapted to engage a wheel and to prevent it from rolling off the platform, when the carriage is being moved with reference to the frame. This means is shown as a standard 30 which is rigidly connected, as at 31, to the platform and is adapted to receive a yoke 32 which carries a transversely extending bar 33. The yoke 32 is adjustable on the standard, while the bar is adjustable with relation to the yoke, so that the holding members can be swung out of alignment with the truck wheel. When the device is brought into proper operative position, fingers 34 slidably mounted on the bar 33 may then be used for engaging the sides of the wheel and thereby clamping it onto the bar. This engagement is sufficient to prevent a wheel from rolling off the platform when the carriage is moved.

To use a device made in accordance with my invention the axle supporting the wheel to be removed is raised sufficiently to permit the frame and carriage to be moved under the raised wheel. Then while the wheel is raised, the threaded spindles 24 are turned so as to raise the carriage platform with reference to the supporting wheels 26. The carriage is thus raised until the platform engages the truck wheel sufficiently to overcome the friction between the wheel and axle. Thereupon the bar 33 and fingers 34 are adjusted as shown in Fig. 3 to clamp the wheel and to hold it against movement with reference to the carriage. The carriage may be moved along the trackway until the truck wheel is removed from the axle. To replace a wheel the reverse procedure is followed.

In view of the foregoing description it will be understood that I have provided a device which is readily adapted for removing or replacing the wheels of a motor truck. Moreover, the device is of such character that it may be readily manufactured and assembled and thereafter satisfactorily used either on a smooth garage floor or on comparatively rough ground. An advantage of a device made in accordance with my invention is that after a wheel is removed, then it may be quickly replaced, since the trackway insures positive alignment between the axis of the wheel and that of the axle.

Having thus described my invention, I claim:

1. In combination, a trackway adapted to be disposed axially of a vehicle wheel, a platform on the trackway, mechanism for enabling the platform to be raised vertically with reference to the trackway for engaging and supporting said wheel, whereby said platform may be moved axially of the wheel for removal and replacement purposes.

2. In combination, a platform, rotatable supporting members therefor, said platform being of low height and adapted to be disposed beneath the wheel of a motor vehicle, means for moving the platform with relation to the members, whereby the platform may be brought into engagement with the wheel and whereby the weight thereof may be supported entirely by said platform, and a trackway disposed beneath the platform, said trackway being engaged by the supporting members, whereby the platform may be moved with the wheel with reference to the motor vehicle.

3. In combination, a platform, supporting wheels therefor, a trackway beneath the platform for guiding said wheels, means for enabling the platform to be moved vertically with relation to the wheels, said platform having a low height whereby it may be disposed beneath the wheel of a motor vehicle when the wheel is raised above the ground, and means for raising the platform with relation to the supporting wheels therefor, so as to bring the platform into engagement with the vehicle wheel, and thereby to remove the weight of said wheel from the supporting axle therefor.

4. In combination, a platform of low height, a trackway, means riding on said trackway for supporting said platform, said means being adapted to permit vertical movement of the platform with relation to the trackway.

5. In combination, a platform, supporting means therefor, said means being so arranged that the platform may be disposed beneath a traction wheel of a motor vehicle, a trackway disposed beneath the platform and providing a guide for the supporting means, whereby the platform may be moved laterally with reference to the traction wheel, mechanism for enabling the platform to be raised vertically with reference to the supporting means, and mechanism above the platform for engaging the wheel and for positioning it on said platform.

6. In combination, a platform, supporting wheels therefor, means connecting said wheels with the platform for enabling the platform to be moved vertically with relation to the wheels, means carried by the platform for engaging a vehicle traction wheel and holding it in upright position, and a trackway disposed beneath the platform for guiding the supporting wheels, whereby the platform and traction wheel may be moved axially of the vehicle wheel.

7. In combination, a frame, a carriage movable on the frame, said carriage comprising a platform, means for moving the platform vertically with relation to the frame, said means being so arranged that platform may be dropped below a plane passing through the top of the frame.

8. In combination, a platform, supporting wheels therefor, a frame providing a trackway for said wheels, means connecting the platform and wheels in such manner that the platform may be moved vertically with reference to trackway and means mounted on the platform for engaging a traction wheel of a motor vehicle and holding it thereon in upright position.

9. In combination, a base having a trackway thereon, wheels movable on the trackway, a platform, means connecting the wheels with the platform, said means including a guideway, a slide, and a threaded member for positioning the slide with reference to the guideway.

10. In combination, a frame having upstanding flanges providing a trackway, wheels movable on said flanges, a slide attached to each wheel, a platform having provision thereon for supporting each slide, and means associated with the platform for moving each slide independently of the other and relatively to said platform.

11. In combination, a platform having a yoke adjacent each corner thereof, a block slidable within each yoke, a wheel carried by each block, and a threaded shaft associated with each yoke and adapted to engage the associated block for moving a wheel relatively to the platform.

12. In combination, a frame comprising longitudinal side bars and transverse end bars, a carriage movable on the side bars, said carriage comprising a rectangular platform, having a yoke adjacent each corner thereof, a block movable within each yoke, a supporting wheel carried by each block, and a threaded member extending through a portion of the yoke and engaging each block, whereby each wheel may be moved independently of the other wheels with relation to the platform.

In testimony whereof, I hereunto affix my signature.

ANTHONY C. BREJSKA.